Figure 1:
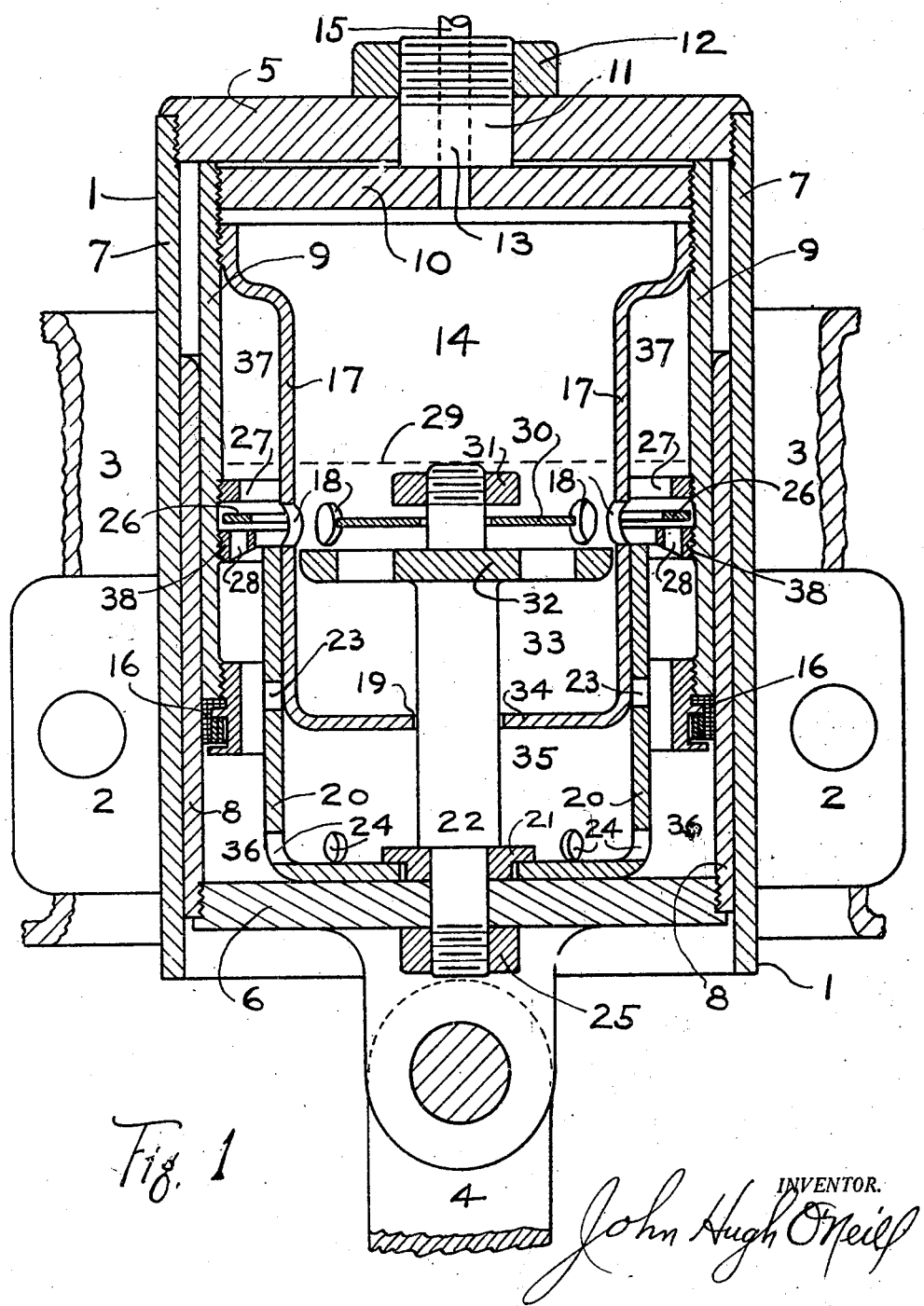

Sept. 18, 1928.  
J. H. O'NEILL  
1,685,077  
AIR SPRING WITH NONELASTIC FLUID SHOCK ABSORBER  
Original Filed Jan. 15, 1925

INVENTOR.  
John Hugh O'Neill

Patented Sept. 18, 1928.

1,685,077

UNITED STATES PATENT OFFICE.

JOHN HUGH O'NEILL, OF SPRINGFIELD, MISSOURI.

AIR SPRING WITH NONELASTIC FLUID SHOCK ABSORBER.

Application filed January 15, 1925, Serial No. 2,658. Renewed February 24, 1928.

My invention relates to improvements in fluid pressure devices commonly called air springs, in which an elastic gaseous fluid is the resilient element and a non-elastic liquid fluid is used to hydraulically dampen the speed of the return of the air spring to normal position from either compressed or extended position.

The object of my invention is to provide a fluid pressure device for use as a spring which may be used in any relation where two bodies are so associated that resilient movement is desirable, and especially where one or the other of the bodies is subject to sudden movements, vibrations, oscillations or shocks which it is undesirable to have transmitted to the other of said bodies.

I attain my object by mechanisms such as those disclosed in the accompanying description and drawing: in which, Fig. 1 is a sectional elevation of an air spring with hydraulic oscillation retarding pistons and cylinders.

Referring to the drawing: 1 is an air spring. 2, 2 are the lugs by which air spring 1 is attached to the side channel 3 of the frame of an automotive vehicle. Any other suitable form of attachment to the sprung load may be used. 4 is the shackle connection from the air spring 1 to the wheel carrying member of an automotive vehicle. This shackle connection 4 may be to the axle or to a steel spring attached to the axle. Any suitable form of attachment may be used between air spring 1 and the unsprung portion of the load, or the wheel carrying member.

The air spring 1 is composed of two members, an upper member 5 and a lower member 6. The upper member 5 is provided with a large or outside tube 7 which forms the outside wall of the air spring 1 and from which the lugs 2 project. The lower member 6 is provided with a smaller or inner tube 8 which telescopes into the tube 7 to form a sliding guide or joint between the upper and lower parts of the air spring 1. The tube 7 is attached to the upper member 5 and preferably is hermetically sealed where so attached. The tube 8 is attached to lower member 6 and hermetically sealed to it. The tube 9 is the inner tube end and tube 8 the outer tube of the telescoping pair of tubes which form a fluid pressure chamber of variable volumetric capacity.

In order that the air spring 1 may be disassembled readily a disc of metal 10 is provided to which tube 9 is attached and hermetically sealed. A threaded lug 11 projects from disc 10 through a registering hole in upper member 5. Disc 10 is drawn firmly against upper member 5 by the nut 12 threaded on lug 11. By removing nut 12 from lug 11, lug 11 can be withdrawn from upper member 5 and all the interior of the air spring removed from tube 7. The lug 11 is provided with a hole 13 communicating with chamber 14 which is the upper portion of the fluid pressure chamber and with a tube 15 through which compressed gaseous fluid hereafter referred to as air, or liquid fluid hereafter referred to as oil, can be introduced into or withdrawn from the fluid pressure chamber enclosed by disc 10, tubes 9 and 8 and lower member 6. Tube 15 is closed by a suitable stop-valve not shown.

Tube 9 is provided with a peripheral packing 16 preferably of flexible material such as leather or rubber of suitable composition reinforced with fabric. Packing 16 forms a fluid tight joint with tube 8. Depending downward from disc 10 is upper cup-shaped member 17 which, in the present illustration, is shown attached through tube 9 to disc 10. Upper cup-shaped member 17 is provided with holes 18 and, in its bottom, a hole 19 preferably concentric. Lower cup-shaped member 20 extends upward from lower member 6 and is self-adjustably attached to lower member 6 by the washer collar 21 and the piston rod 22. Lower cup-shaped member 20 is provided with a row of holes 23, preferably in an annular row, and with holes 24 preferably in an annular row at the base of the cup. The end of piston rod 22 is threaded and extends through lower member 6 and is secured by nut 25.

In order to withdraw tube 8 conveniently from telescopic engagement with tube 9, which is necessary in renewing packing 16, nut 25 is removed and the piston rod 22 released from engagement with lower member 6.

A return from compression retarding valve 26 is held between a motion stop ring 27 and a valve seat ring 28 carried by tube 9. This return from compression retarding valve is opened by the upward flow of oil when the air spring 1 is compressed from normal position, which is the position shown, and on return from compressed position to normal position is closed by the downward flow of oil. A suitable oil level is shown by dotted line 29.

A return from extension retarding valve 30 is carried between the valve motion stop nut 31 and the valve seat piston 32. This return from extension retarding valve is opened by the flow of oil out of the space or chamber 33 enclosed between piston 32 and the bottom 34 of cup-shaped member 17, as occurs when air spring 1 is extended from normal position, and is closed by the flow of oil back into space 33 when air spring 1 returns from extended position to normal position.

In operation, assuming that the air spring 1 is fully compressed, the oil in space or chamber 35 will be forced out through holes 24 into chamber 36 which chamber communicates through valve 26 with chamber 37. This forcing of the oil is caused by the rise of lower member 6 and lower cup-shaped member 20 upward toward the bottom 34 of cup-shaped member 17. Part of this oil will flow into chamber 14 through holes 18 until holes 18 are sealed by the telescoping over them of lower cup-shaped member 20, after which the oil from chamber 35 will enter chamber 37 which is hermetically sealed at the top and contains compressed air. The oil level 29 will rise in both chambers 14 and 37 as the air spring 1 is compressed with accompanying increase in the compression of the air in both chambers, but with the modification that after holes 18 are sealed and the oil from chamber 35 enters chamber 37 only, then the oil will rise rapidly in chamber 37 for there is added to the general rise the rise in level produced by the oil from chamber 35. This rapid rise of the oil level in chamber 37 as the full compressed position is approached is intended and is a most useful feature of my invention, because such rapid rise of oil level in chamber 37 compresses the air in chamber 37 more rapidly than the air is compressed in chamber 14 which produces a rapid increase in the supporting strength of air spring 1 as said spring approaches fully compressed position.

It will be noted that, as chamber 37 is in hydraulic communication with chambers 36 and 35, the increased air pressure in chamber 37 communicates equal fluid pressure throughout the chambers 37 and 35, so that the sprung load is supported by the same fluid pressure as is present in chamber 37 over the whole area of the upper surfaces of chambers 37 and 35 plus such momentary additional support as may be afforded by piston 32 with valve 30 closed. Such support would be afforded in the case when piston 32 travelled upward past holes 18 at sufficient speed to cause a partial vacuum in chamber 35 thus causing the fluid pressure to be unequal on the upper and lower ends of piston 32. The greater fluid pressure will then be on the top of piston 32 and act to press against and support the opposite side or upper end of chamber 14 which is formed by disc 10.

On the return of air spring 1 from compressed position, the valve 26 and valve seat 28 form an annular return from compression retarding piston 38 attached to tube 9 and operating in annular chamber 36. In compression of air spring 1, the relative movement of the upper and lower members causes piston 38 to be introduced into chamber 36 during which the valve 26 is open. On return from compression the valve 26 is heated on valve seat 28, and piston 38 acts to restrict the flow of oil from chamber 37 into chamber 36 and from chamber 36 into chamber 35. The clearance between piston 38 and the outer wall of lower cup-shaped member 20, preferably determines the amount of restriction of the oil flow into chambers 36 and 35 and thus the amount of retardation of the return of air spring 1 to normal position from compressed position. Such return takes place as the oil is returned to chamber 35 under fluid pressure from the compressed air in chambers 37 and 14.

When the air spring 1 moves to fully extended position the following actions take place:

The elastic fluid pressure exerted from chambers 14 and 37 forces oil from chamber 37 and through holes 18 from chamber 14 into chamber 36 and thence into chamber 35 which causes cup-shaped member 20 to be forced downward and relatively away from cup-shaped member 17. Similar force is used to move the bottom of chamber 36 relatively away from the top of chamber 37. As cup-shaped member 20 moves away from cup-shaped member 17 the top of cup-shaped member 20 also moves away from the annular piston 38 so that the clearance space for oil to flow past piston 38 is increased by the area of the top rim of cup-shaped member 20 which allows of a very rapid flow of oil or air past piston 38. Holes 23 in cup-shaped member 20 furnish additional passage area through which oil from chamber 36 may flow into chamber 35 after air spring 1 has moved in extension far enough for cup-shaped member 17 to uncover them. The piston 32 being attached by piston rod 22 to lower member 6 is carried downward and approaches to the bottom 34 of cup-shaped member 17. The oil in chamber 33 passes through valve 30 to the upper side of piston 32 into chamber 14.

The air spring 1 returns from extended position to normal position, but at a retarded rate due to the closing of valve 30 and the restricted opening caused thereby for the return of oil from chamber 14 to chamber 33 through the clearance space between piston 32 and the inner wall of cup-shaped member 17. Piston 32, during this return, has on its upper surface the fluid pressure in chamber 14, and on its under surface a partial vacuum in chamber 33. The oil in chamber 14, impelled by the fluid pressure in chamber 14, flows into chamber 33, and as it flows, piston 32 moves away from the bottom 34 of cup-shaped member 17. The bottom 34 of cup-shaped member 17 at the same time enters farther into cup-shaped member 20 and displaces oil from chamber 35, which oil flows freely out through holes 23 and 24 into chamber 36, from which it enters chamber 37 past piston 38. A portion of this oil flows into chamber 14 through holes 18. The oil in flowing from chamber 35 offers small resistance to the entry of cup bottom 34 into chamber 35 as the escape openings are large.

If the wheel should strike a large projection on the road while air spring 1 is in extended position, air spring 1 can be forced quickly, almost instantaneously, into normal or compressed position by the severe shock, since the vacuum in chamber 33 produced by the sudden movement of piston 32 away from cup bottom 34 is an elastic means of retardation. The return of air spring 1 from extended to normal position thus will be retarded only in the absence of severe compressive shock.

There is no positive retarding effect which will act to restrict the elastic yielding of the air spring in the event of a severe compressive shock since the return from compressed position is retarded by the flow of oil downward past piston 38, the valve 26, of which opens with compressive movement, and the return from extended position is retarded by a vacuum. This elasticity of air spring 1 at all times to compressive shock is the great advantage secured by my construction, together with retarded return from both compressed and extended positions. This retarded return from extension is produced by the return from extension retarding piston composed of return from extension retarding valve 30 and its valve seat piston 32 operating in chamber 33.

I claim:

1. In an air spring with non-elastic fluid shock absorbers, a vertically disposed, telescoping pair of tubes forming a fluid pressure chamber of variable volumetric capacity, liquid and gaseous fluids within said fluid pressure chamber, the upper tube of said telescoping pair of tubes being provided with a piston containing an automatic valve opening with an upward and closing with a downward flow of fluid, and an upper cup-shaped member depending bottom downward, said upper cup-shaped member being provided with an annular row of orifices in the side wall thereof the lower tube of said telescoping pair of tubes being provided with a piston containing an automatic valve opening with an upward and closing with a downward flow of fluid, and a lower cup-shaped member, said lower cup-shaped member being provided with an annular row of orifices adjacent to the bottom of the side wall thereof.

2. In an air spring with non-elastic fluid shock absorbers, a vertically disposed telescoping pair of tubes forming a fluid pressure chamber of variable volumetric capacity, liquid and gaseous fluids within said fluid pressure chamber, the upper tube of said pair of tubes being provided with a piston containing an automatic valve opening with an upward and closing with a downward flow of fluid, and a cup-shaped member depending bottom downward, the lower tube of said pair of tubes being provided with a piston containing an automatic valve opening with an upward and closing with a downward flow of fluid, said cup-shaped member being provided with an annular row of orifices in the side wall thereof.

3. In an air spring with non-elastic fluid shock absorbers, a vertically disposed, telescoping pair of tubes forming a fluid pressure chamber of variable volumetric capacity, liquid and gaseous fluids within said fluid pressure chamber, the upper tube of said pair of telescoping tubes being provided with a cup-shaped member depending bottom downward, said cup-shaped member being provided with an annular row of orifices in the side wall thereof, the lower tube of said pair of telescoping tubes being provided with a piston containing an automatic valve, said automatic valve opening with an upward flow and closing with a downward flow of fluid, said piston being adapted to reciprocate in said cup-shaped member.

JOHN HUGH O'NEILL.